(12) United States Patent
Arroyo et al.

(10) Patent No.: US 10,585,743 B2
(45) Date of Patent: *Mar. 10, 2020

(54) MULTIPLE RESET MODES FOR A PCI HOST BRIDGE

(71) Applicant: International Business Machines Corporation, Armonk, NY (US)

(72) Inventors: Jesse P. Arroyo, Rochester, MN (US); Rama K. Hazari, Hyderabad (IN); Sakethan R. Kotta, Hyderabad (IN); Kumaraswamy Sripathy, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 73 days.

This patent is subject to a terminal disclaimer.

(21) Appl. No.: 15/652,509

(22) Filed: Jul. 18, 2017

(65) Prior Publication Data
US 2017/0315861 A1 Nov. 2, 2017

Related U.S. Application Data

(63) Continuation of application No. 14/922,367, filed on Oct. 26, 2015, now Pat. No. 9,792,171.

(51) Int. Cl.
*G06F 11/00* (2006.01)
*G06F 11/07* (2006.01)
(Continued)

(52) U.S. Cl.
CPC ........ *G06F 11/0793* (2013.01); *G06F 9/4411* (2013.01); *G06F 11/0745* (2013.01);
(Continued)

(58) Field of Classification Search
CPC ............ G06F 11/0793; G06F 11/0745; G06F 11/1441; G06F 11/221; G06F 11/3027; G06F 9/4411
See application file for complete search history.

(56) References Cited

U.S. PATENT DOCUMENTS 5,968,172 A 10/1999 Aleshi
9,804,877 B2 10/2017 Hunter et al.
(Continued)

OTHER PUBLICATIONS

Arroyo et al., "Multiple Reset Modes for a PCI Host Bridge" U.S. Appl. No. 14/922,367, filed Oct. 26, 2015.
(Continued)

*Primary Examiner* — Michael Maskulinski
(74) *Attorney, Agent, or Firm* — Martin & Associates, LLC; Derek P. Martin

(57) ABSTRACT

A PCI host bridge (PHB) includes a warm reset mode and a full reset mode. When a fatal error occurs, the type of fatal error is determined, a reset mode corresponding to that type of fatal error is determined, and a reset corresponding to the reset mode is performed. A full reset clears the error registers, status registers and configuration registers, which then requires the configuration registers to be reconfigured before the PHB can be reinitialized. A warm reset clears the error registers and status registers, but does not clear the configuration registers. A warm reset thus does not require the time to write to the configuration registers, and the PHB can be reinitialized using the existing configuration data in the configuration registers while link training is done in parallel. When initialization of the PHB after a warm reset is not successful, a full reset is performed.

7 Claims, 7 Drawing Sheets

(51) Int. Cl.
*G06F 13/40* (2006.01)
*G06F 11/30* (2006.01)
*G06F 9/4401* (2018.01)
*G06F 11/14* (2006.01)
*G06F 11/22* (2006.01)
*G06F 13/42* (2006.01)

(52) U.S. Cl.
CPC ........ *G06F 11/1441* (2013.01); *G06F 11/221* (2013.01); *G06F 11/3027* (2013.01); *G06F 11/3055* (2013.01); *G06F 13/4027* (2013.01); *G06F 13/4282* (2013.01)

(56) References Cited

U.S. PATENT DOCUMENTS

| | | |
|---|---|---|
| 10,002,085 B2 | 6/2018 | Cha et al. |
| 2004/0210793 A1 | 10/2004 | Chokshi et al. |
| 2005/0081126 A1* | 4/2005 | Kulkarni ............. G06F 11/0712 714/56 |
| 2006/0281630 A1 | 12/2006 | Bailey et al. |
| 2012/0159245 A1 | 6/2012 | Brownlow et al. |
| 2014/0380028 A1 | 12/2014 | Cheng et al. |
| 2015/0095700 A1 | 4/2015 | Arroyo et al. |
| 2015/0127969 A1 | 5/2015 | Arroyo et al. |

OTHER PUBLICATIONS

Arroyo et al., "Multiple Reset Modes for a PCI Host Bridge" U.S. Appl. No. 14/992,201, filed Jan. 11, 2017.
Appendix P—List of IBM Patents or Patent Applications Treated As Related, dated Aug. 31, 2017.
Internet Society RFCS et al.; "Supplemental Information for the New Definition of the EF PHB (Expedited Forwarding Per-Hop Behavior)"; An IP.com Prior Art Database Technical Disclosure; http://ip.com/IPCOM/000007484; Apr. 1, 2002.
Internet Society RFCS et al.; "An Expedited Forwarding PHB"; An IP.com Prior Art Database Technical Disclosure; http://ip.com/IPCOM/000003185; Sep. 13, 2000.
Internet Society RFCS et al.; "An Expedited Forwarding PHB (Per-Hop Behavior)"; An IP.com Prior Art Database Technical Disclosure; http://ip.com/IPCOM/000007370; Mar. 20, 2002.

* cited by examiner

| Bit 1 | Bit 0 | Reset Mode |
|---|---|---|
| 0 | 0 | Initialization or Reset Complete |
| 0 | 1 | Full Reset |
| 1 | 0 | Warm Reset |
| 1 | 1 | Reserved |

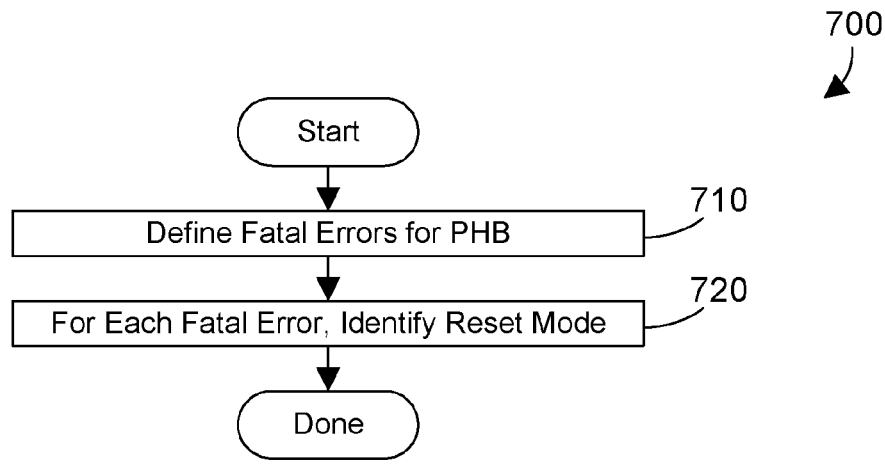

FIG. 7

| Fatal Error | Reset Mode |
|---|---|
| Internal data bus – invalid command | Warm |
| Internal data bus – size/alignment error | Warm |
| Internal data bus – parity error | Warm |
| Internal data bus – sequence error | Warm |
| PCIe transaction logic parity error | Warm |
| PCIe bus completion timeout | Warm |
| Transaction to system memory timeout | Warm |
| PCIe replay buffer ECC error | Warm |
| Internal IODA table uncorrectable ECC error | Full |
| Internal Register parity/ECC error | Full |
| Host viewable register parity/ECC error | Full |
| IODA engine internal fatal error | Full |

FIG. 8

MULTIPLE RESET MODES FOR A PCI HOST BRIDGE

BACKGROUND

1. Technical Field

This disclosure generally relates to resetting an integrated circuit, and more specifically relates to resetting a PCI host bridge.

2. Background Art

A PCI host bridge (PHB) is an integrated circuit or chipset that provides an interface between a CPU bus, such as a PowerPC CPU bus, and a PCI bus, such as a PCI express (PCIe) bus. PCI host bridges are very common in modern computer systems.

In the existing PowerPC architecture, when a fatal error occurs in a PHB, the PHB is reset, which clears all the registers including the configuration registers. The firmware must then reconfigure all the configuration registers, even when the configuration is the same as before the fatal error. The reset process may include time waiting to make sure all PowerPC bus operations are finished before resetting the PHB. The time waiting for all PowerPC bus operations to finish plus the time to reset the PHB can be in the range of six to eight seconds.

High availability computer systems allow recovery of a fatal error in a graceful way that is mostly transparent to the user. Many high availability computer systems include virtual machines. A high availability computer system may have a failover time threshold where if a virtual machine does not respond within the specified failover threshold, the high availability computer system initiates failover of a virtual machine. For example, a high availability system may have a failover threshold of 12 seconds, which means if a logical partition is unresponsive for 12 seconds, the logical partition is moved to a different virtual machine. If a fatal error in a PHB takes six to eight seconds for the PHB to recover, and the virtual operating system in a virtual machines takes an additional three to five seconds to finish recovering the adapter and start Ethernet traffic, then the client logical partition takes a second or two to reestablish the TCP/IP connection, the total time delay caused by a fatal error in the PHB can exceed the failover threshold for the VM, which will cause a failover of the virtual machine when the virtual machine has not failed, but simply needs time to finish recovering from a PHB fatal error.

One possible solution would be to make the failover threshold higher. So instead of 12 seconds, the failover threshold could be set to 20 seconds. If the failover threshold were set to 20 seconds, one could be sure that any fatal error in a PHB would be recovered from within the 20 second time period, which would prevent a failover from occurring due to the wait associated with a PHB fatal error. This solution is not desirable because it creates additional delays in performing failover when failover is needed. Thus, by changing the failover threshold from 12 to 20 seconds, each time a failover is needed, there is an additional eight seconds of delay before the failover occurs. This additional time is not acceptable in a high availability system because this delay is perceivable to end users.

SUMMARY

A PCI host bridge (PHB) includes a warm reset mode and a full reset mode. A reset mode is defined for multiple fatal errors. When a fatal error occurs, the type of fatal error is determined, the reset mode corresponding to that type of fatal error is determined, and a reset corresponding to the reset mode is performed. A full reset clears the error registers, status registers and configuration registers, which then requires the configuration registers to be reconfigured before the PHB can be reinitialized. A warm reset clears the error registers and status registers, but does not clear the configuration registers. A warm reset thus does not require the time to write to the configuration registers, and the PHB can be reinitialized using the existing configuration data in the configuration registers while link training is done in parallel, which greatly speeds the time for the PHB to recover from a fatal error. When initialization of the PHB after a warm reset is not successful, a full reset is performed.

The foregoing and other features and advantages will be apparent from the following more particular description, as illustrated in the accompanying drawings.

BRIEF DESCRIPTION OF THE DRAWING(S)

The disclosure will be described in conjunction with the appended drawings, where like designations denote like elements, and:

FIG. 7 is a flow diagram of a method for defining reset modes for multiple fatal errors in a PHB;

FIG. 8 is a block diagram of a table showing fatal errors in a PHB and a corresponding reset mode for each fatal error;

DETAILED DESCRIPTION

The disclosure and claims herein relate to a PCI host bridge (PHB) that includes a warm reset mode and a full reset mode. A reset mode is defined for multiple fatal errors. When a fatal error occurs, the type of fatal error is determined, the reset mode corresponding to that type of fatal error is determined, and a reset corresponding to the reset mode is performed. A full reset clears the error registers, status registers and configuration registers, which then requires the configuration registers to be reconfigured before the PHB can be reinitialized. A warm reset clears the error registers and status registers, but does not clear the configuration registers. A warm reset thus does not require the time to write to the configuration registers, and the PHB can be reinitialized using the existing configuration data in the configuration registers while link training is done in parallel, which greatly speeds the time for the PHB to recover from a fatal error. When initialization of the PHB after a warm reset is not successful, a full reset is performed.

Figure 1:
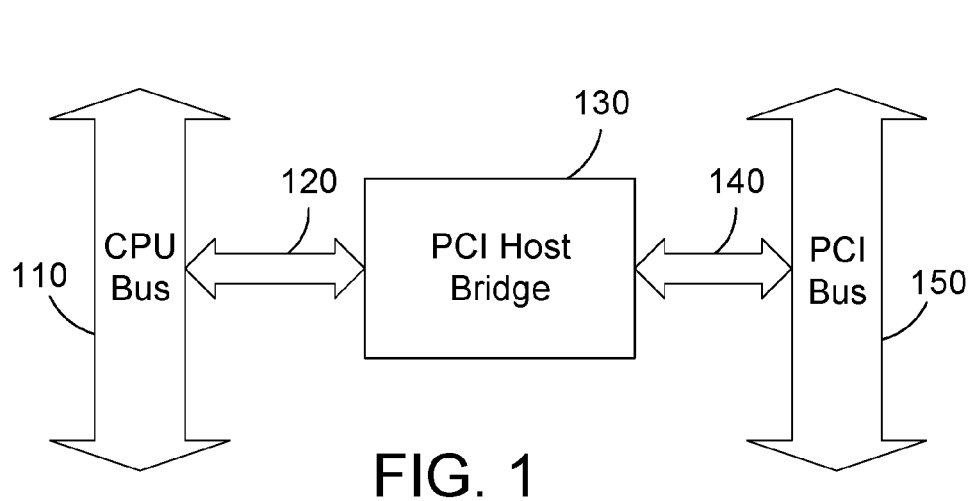
FIG. 1 is a block diagram of part of a computer system that includes a PCI host bridge (PHB)

Referring to FIG. 1, a portion of a computer system 100 is shown with a PCI Host Bridge (PHB) 130 that includes an interface 120 to a CPU bus 110 and an interface 140 to a PCI bus 150. The CPU bus could be, for example, a bus on a PowerPC processor. Of course, any suitable processor could be used. The PCI bus 150 could be any suitable type of PCI bus, such as a PCI express (PCIe) bus.

Figure 2:
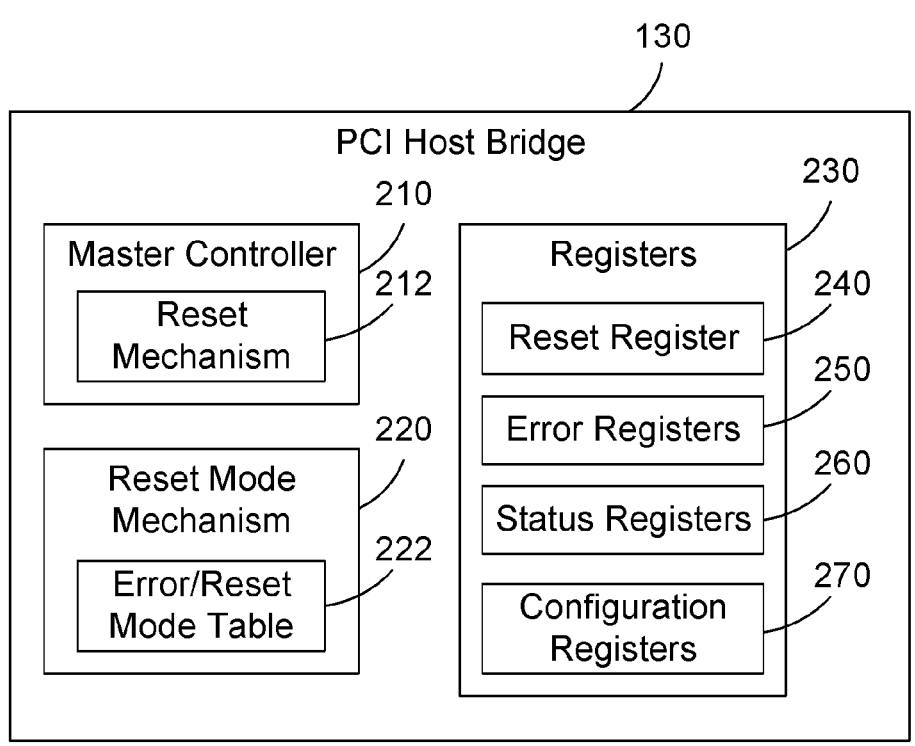
FIG. 2 is a block diagram showing some features in the PCI host bridge in FIG. 1.

The PCI Host Bridge 130 is shown in more detail in FIG. 2. Note that many of the features and functions of known PCI host bridges are not explicitly shown in FIG. 2 for the sake of simplifying the figure. One skilled in the art will understand the PCI host bridge 130 includes many features known in the art that are not discussed herein. The PCI host bridge 130 includes a master controller 210, a reset mode mechanism 220, and registers 230. The master controller 210 includes a reset mechanism 212 that resets the PCI host bridge 130 using multiple reset modes. The reset mode mechanism 220 includes an error/reset mode table 222 that includes multiple fatal errors for the PCI host bridge 130, with each fatal error having a corresponding specified reset mode. Registers 230 include a reset register 240, error registers 250, status registers 260, and configuration registers 270. The reset register 240 defines multiple reset modes. The error registers 250 log errors in the PCI host bridge 130. The status registers 260 log status information for the PCI host bridge 130. The configuration registers 270 define the function of the PCI host bridge 130. During a full reset, the contents of the error registers 250, status registers 260 and configuration registers 270 are all cleared, which then requires data to be written to the configuration registers 270 even when that data is the same as before the reset. During a warm reset, the contents of the error registers 250 and status registers 260 are cleared, but the configuration registers 270 are not cleared. This means the system does not have to take the time to reinitialize all the configuration registers 270. Instead, the existing data in the configuration registers 270 can be used to reinitialize the PHB 130, which greatly speeds up recovery from a PHB fatal error.

Figure 3:
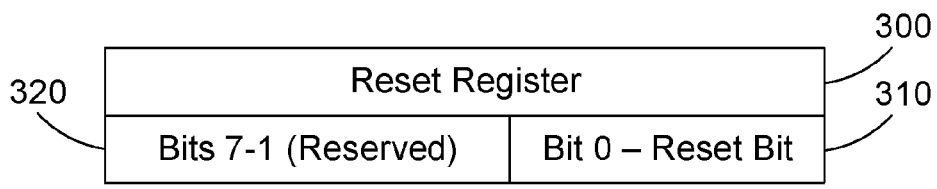
FIG. 3 is a block diagram showing a reset register in a PCI host bridge.

A reset register 300 is shown in FIG. 3 to illustrate how to reset a PCI host bridge when a single reset mode is defined. Bit 0 310 is a reset bit, while bits 7-1 320 are reserved for future use. When the reset bit 310 is set, the PHB 130 starts a reset. The PBH 130 clears the reset bit 310 once the reset is complete.

Figure 4:
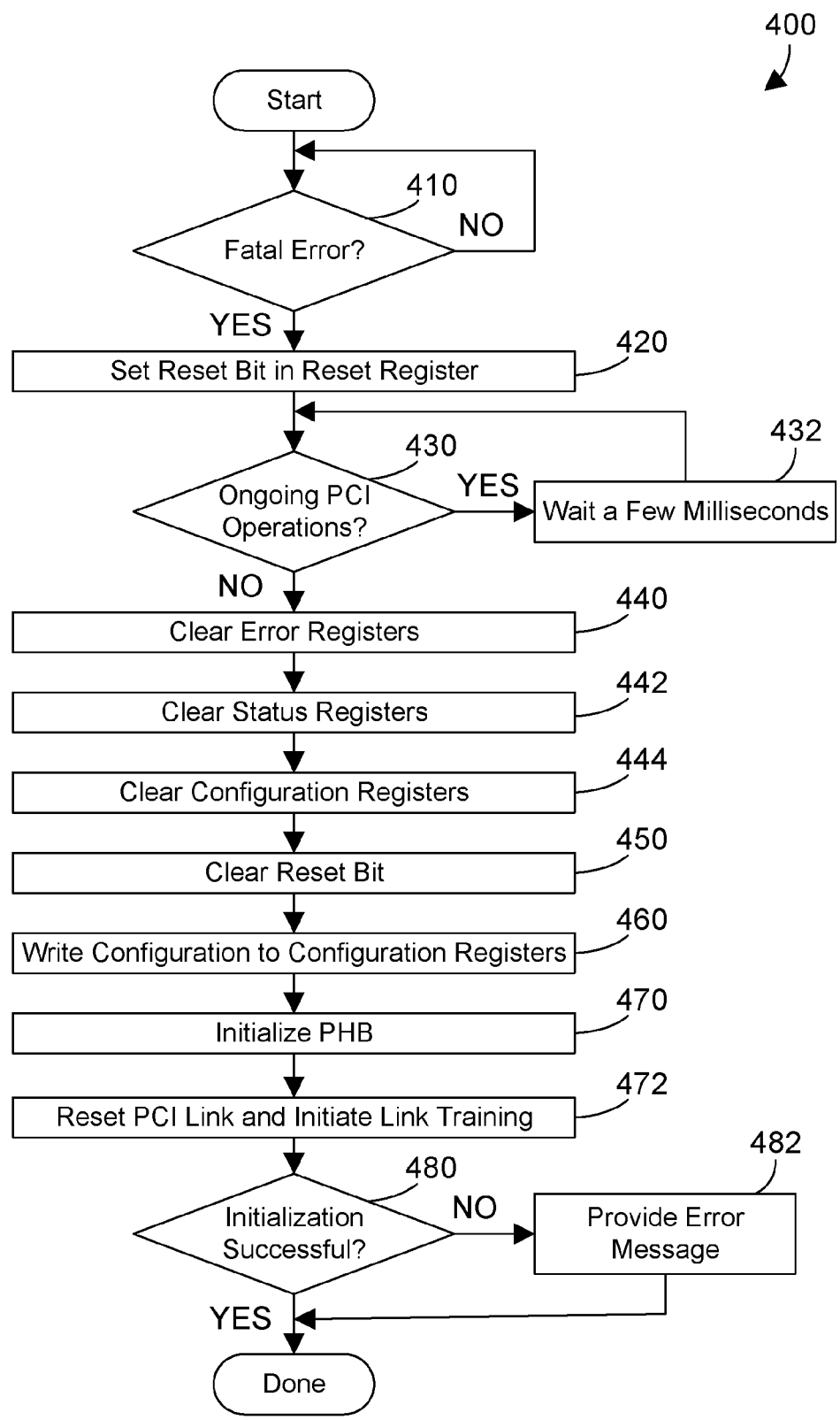
FIG. 4 is a flow diagram of a method for resetting a PHB that has a single reset mode.

Referring to FIG. 4, a method 400 shows how a reset is performed for a PHB when there is only one type of reset defined, as discussed with reference to FIG. 3. Method 400 waits for a fatal error to occur. As long as no fatal error occurs (step 410=NO), method 400 loops back to step 410 until a fatal error occurs (step 410=YES). The reset bit in the reset register (shown in FIG. 3) is set (step 420). When there are ongoing operations on the PCI bus that are still pending (step 430=YES), method 400 waits a few milliseconds (step 432) then checks again to see if any ongoing operations on the PCI bus are still pending (step 430). Once no ongoing operations are pending (step 430=NO), the error registers are cleared (step 440), the status registers are cleared (step 442), and the configuration registers are cleared (step 444). The reset bit is then cleared (step 450), and configuration data is written to the configuration registers (step 460). The PHB is then initialized (step 470) with the newly-written data written to the configuration registers in step 460. The PCI link is then reset and link training is initiated (step 472). Link training is well-known in the art, and is a way to establish a connection at a lower speed, then increase the speed so the highest data rate of communication for the link can be determined. When the initialization of the PHB is successful (step 480=YES), method 400 is done. When the initialization of the PHB is not successful (step 480=NO), an error message is provided (step 482), and method 400 is done.

A significant disadvantage of providing a single reset mode as shown in FIGS. 3 and 4 is the configuration registers are always cleared in step 444 of FIG. 4 during a reset, which then requires writing configuration data to the configuration registers in step 460. This process of writing configuration data to the configuration registers can take significant time, thereby delaying how quickly the PHB can recover from a fatal error. In addition, reset of the PCI link and link training is done after the reset is performed, which can take significant additional time. In the case of high availability systems, the delay caused by having to write configuration data to all of the configuration registers and then having to perform link training can cause a virtual machine to failover due to the recovery time of the PHB exceeding the failover threshold.

Figures 5, 6:
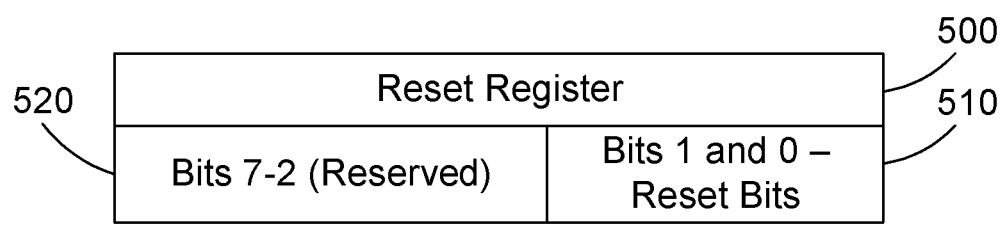
FIG. 5 is block diagram of a reset register that defines multiple reset modes.
FIG. 6 is a table showing how the multiple reset modes correspond to bit settings in the reset register shown in FIG. 5.

The PHB disclosed and claimed herein includes a reset register 500 as shown in FIG. 5, which is one suitable implementation for the reset register 240 shown in FIG. 2 for the PHB 130. The reset register 500 uses two bits, bits 1 and 0 510, to define multiple reset modes. Bits 7-2 520 are reserved. FIG. 6 shows one suitable way to use bits 1 and 0 510 to define multiple reset modes. When bits 1 and 0 are both reset, this means initialization or reset has completed, which means the PHB is operating normally. When a full reset is needed, bit 1 is cleared and bit 0 is set, as shown in FIG. 6. When a warm reset is needed, bit 1 is set and bit 0 is cleared, as shown in FIG. 6. Both bits set corresponds to a reserved mode that is not currently needed or implemented.

With a reset register 500 as shown in FIG. 5 that supports multiple reset modes, it is now possible for a PHB to perform different types of resets depending on the type of fatal error it received. Referring to FIG. 7, a method 700 is preferably performed by the reset mode mechanism 220 shown in FIG. 2 to define for each of a plurality of fatal errors a corresponding reset mode. The fatal errors in the PHB are defined (step 710). For each fatal error, a corresponding reset mode is identified (step 720). Method 700 is then done. Performing method 700 in FIG. 7 could produce a data structure such as the table 800 in FIG. 8 that correlates fatal errors and reset modes. Table 800 is one suitable example of the error/reset mode table 222 shown in FIG. 2. While a table is referenced at 222 in FIGS. 2 and 800 in FIG. 8, one skilled in the art will recognize that any suitable data structure could be used to correlate fatal errors in the PHB 130 with corresponding reset modes. In table 800, the following fatal errors all have a warm reset mode: internal data bus—invalid command; internal data bus—size/alignment error; internal data bus—parity error; internal data bus—sequence error; PCIe transaction logic parity error; PCIe bus completion timeout; transaction to system memory timeout; and PCIe replay buffer error correction code (ECC) error. The following fatal errors in table 800 have a full reset mode: internal IO Design Architecture (IODA) table uncorrectable ECC error; internal register parity/ECC error; host viewable register parity/ECC error; and IODA engine internal fatal error.

Figure 9:
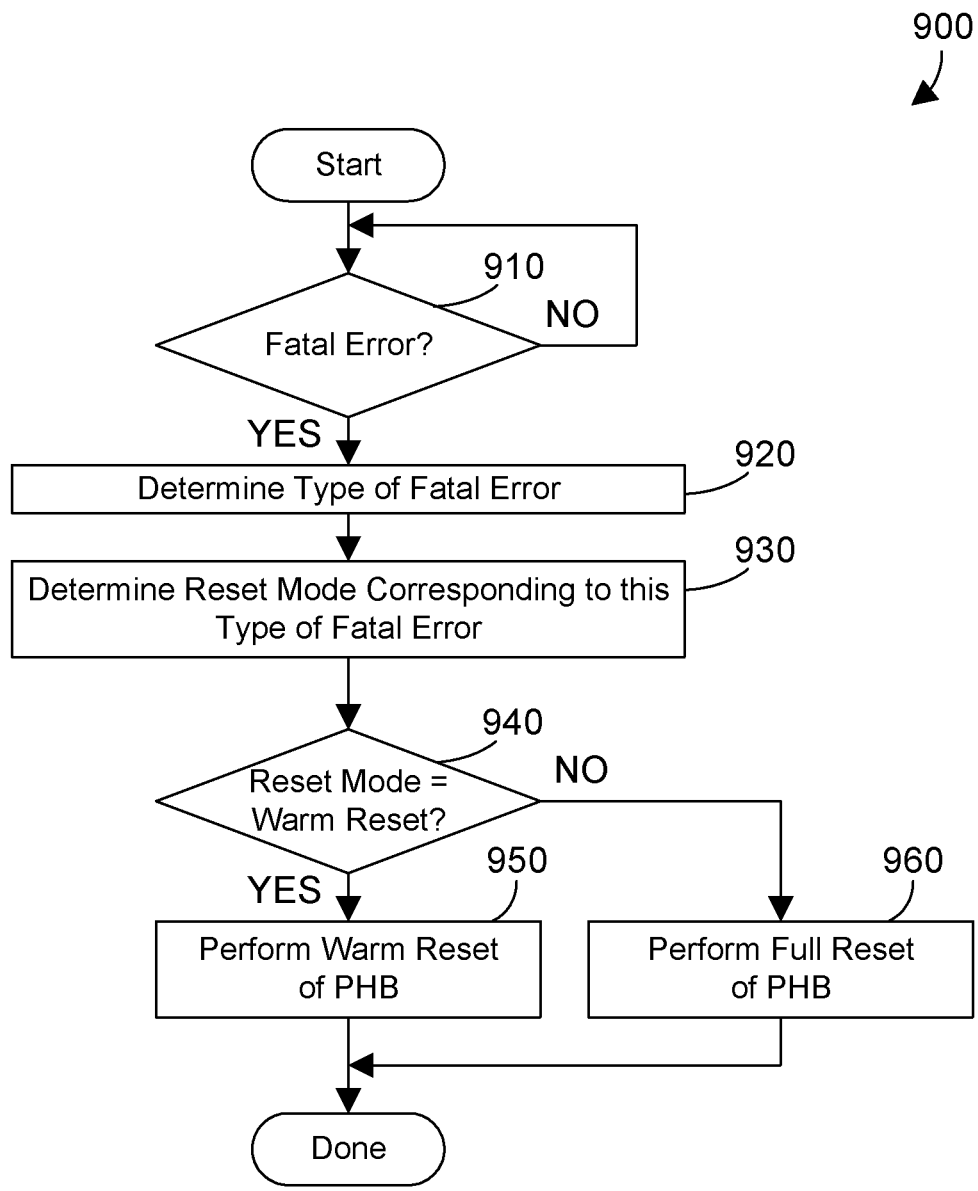
FIG. 9 is a flow diagram of a method for determining whether to do a warm reset or full reset based on the type of fatal error.

Now that a reset mode has been defined in FIGS. 7 and 8 for each of a plurality of fatal errors in the PHB 130, the reset mechanism 212 in FIG. 2 can perform different types of resets depending on the specific fatal error received. Referring to FIG. 9, method 900 is preferably performed by the reset mechanism 212 in FIG. 2. When no fatal error has occurred (step 910=NO), method 900 loops back until a fatal error occurs (step 910=YES). The type of the fatal error is determined (step 920). This can be done, for example, by reading one or more of the error registers 250 shown in FIG. 2. Once the type of fatal error is determined, the reset mode corresponding to this type of fatal error is determined (step 930). This can be done by querying the data structure that correlates fatal errors to corresponding reset modes. For example, for table 800 in FIG. 8, if the type of fatal error is internal data bus—invalid command, the reset mode is warm. If the type of fatal error is internal register parity/ECC error, the reset mode is full. When the reset mode corresponding to the type of fatal error received is warm reset (step 940=YES), a warm reset of the PHB is performed (step 950). When the reset mode is not warm reset (step 940=NO), which means the reset mode is full reset, a full reset of the PHB is performed (step 960). Method 900 is then done.

Figure 10:
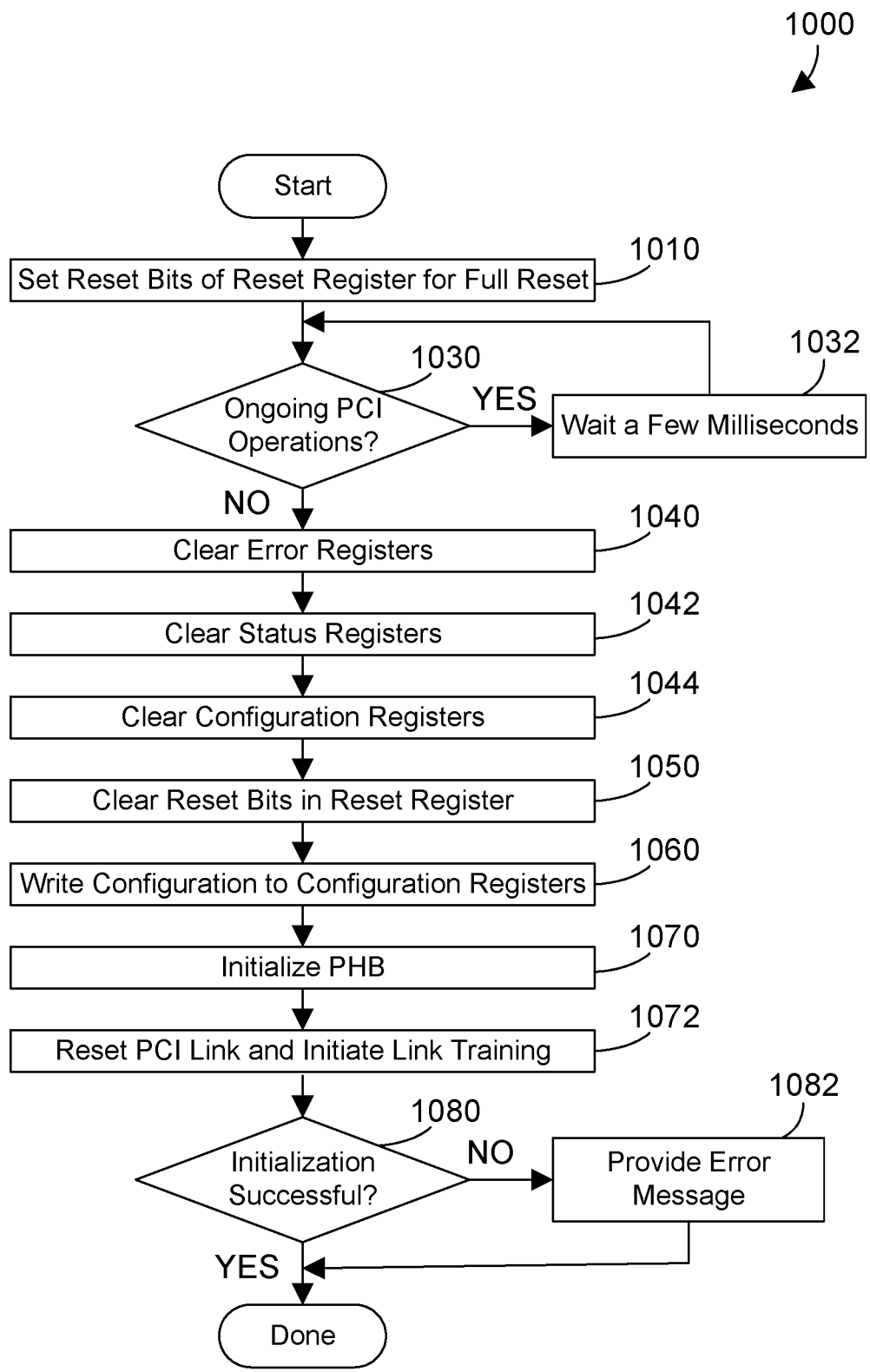
FIG. 10 is a flow diagram of a method for performing a full reset of a PHB.

FIG. 10 shows a method 1000 that is one suitable implementation for the reset mechanism 212 in FIG. 2 to perform a full reset of the PHB 130. Method 1000 is thus one suitable implementation for step 960 in FIG. 9. The reset bits of the reset register are set for full reset (step 1010). When the reset register is implemented as shown in FIG. 5, this means bit 1 is cleared and bit 0 is set. When there are ongoing operations pending on the PCI bus (step 1030=YES), method 1000 waits a few milliseconds (step 1032), then checks to see if there are still ongoing operations on the PCI bus (step 1030). Once there are no more ongoing operations on the PCI bus (step 1030=NO), the error registers are cleared (step 1040), the status registers are cleared (step 1042), and the configuration registers are cleared (step 1044). The reset bits in the reset register are then cleared (step 1050). Configuration data is then written to the configuration registers (step 1060), and the PHB is then initialized with the new configuration data just written to the configuration registers (step 1070). The PCI link is then reset and link training is initiated (step 1072). When initialization of the PHB is successful (step 1080=YES), method 1000 is done. Note that successful initialization of the PHB in step 1080 preferably includes successful link training that was initiated in step 1072, which can take a significant amount of time. When initialization of the PHB is not successful (step 1080=NO), an error message is provided (step 1082) and method 1000 is done. Note that method 1000 is similar in many respects to many of the steps performed when there is only one reset mode, as shown by the steps in method 400 in FIG. 4, because the one reset mode shown in FIG. 4 is similar to a full reset in FIG. 10.

Figure 11:
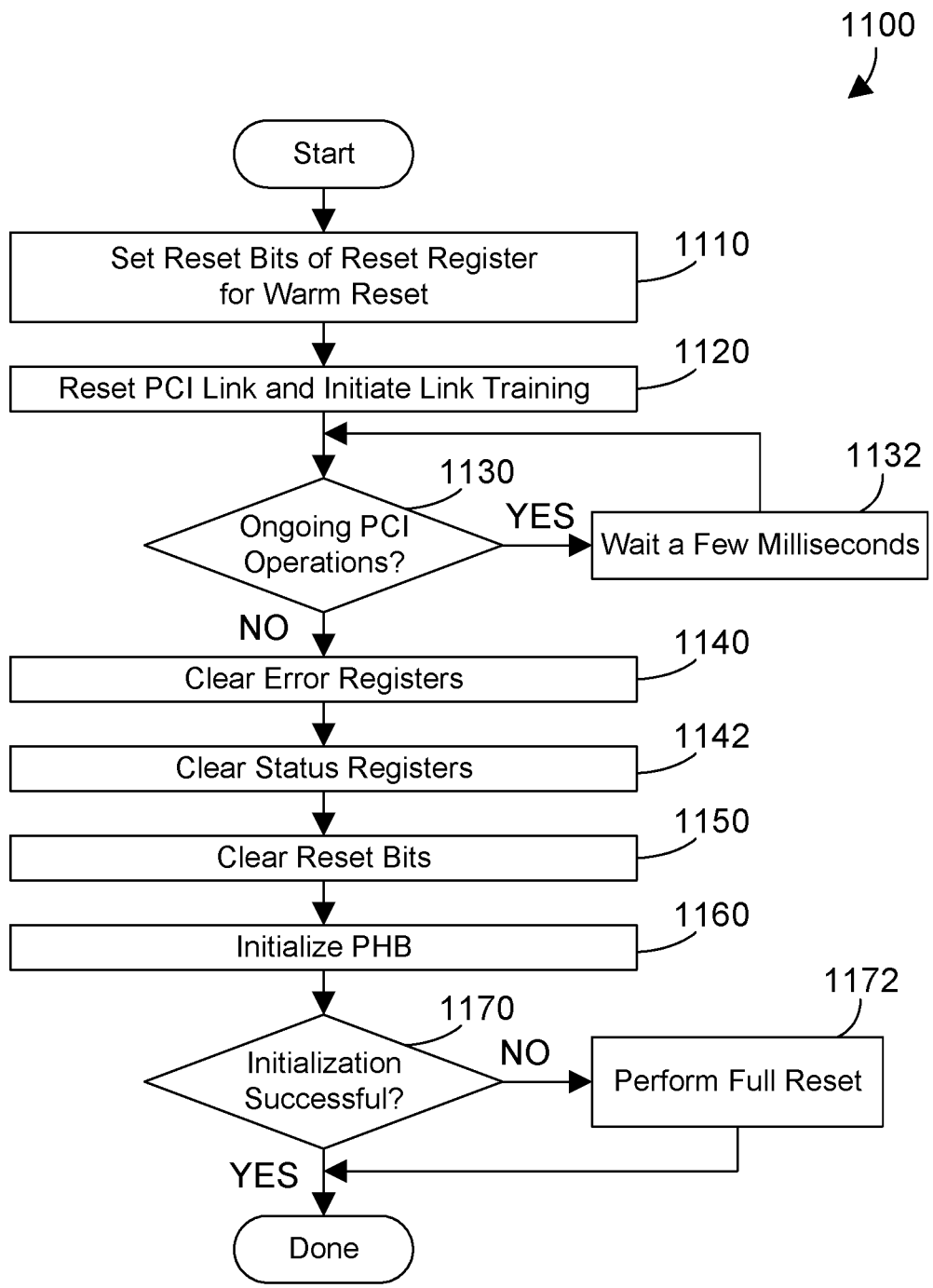
FIG. 11 is a flow diagram of a method for performing a warm reset of a PHB.

FIG. 11 shows a method 1100 that is one suitable implementation for the reset mechanism 212 in FIG. 2 to perform a warm reset of the PHB 130. Method 1100 is thus one suitable implementation for step 950 in FIG. 9. The reset bits of the reset register are set for warm reset (step 1110). When the reset register is implemented as shown in FIG. 5, this means bit 1 is set and bit 0 is cleared. The PCI link is reset and link training is initiated (step 1120). Link training can be initiated early in the warm reset process in method 1100 because the configuration registers will not be cleared during the reset. Link training may continue in parallel during many of the subsequent steps shown in FIG. 11, which allows the warm reset to complete substantially faster than the full reset shown in FIG. 10. When there are ongoing PCI operations pending (step 1130=YES), method 1100 waits a few milliseconds (step 1132), then checks to see if there are still ongoing PCI operations (step 1130). Once there are no more ongoing PCI operations (step 1130=NO), the error registers are cleared (step 1140) and the status registers are cleared (step 1142). Note the configuration registers are not cleared, which means existing data in the configuration registers can be used to reinitialize the PHB. The reset bits in the reset register are then cleared (step 1150). The PHB is then initialized with the existing configuration data in the configuration registers (step 1160). When initialization of the PHB is successful (step 1170=YES), method 1100 is done. Note that successful initialization of the PHB in step 1170 preferably includes successful link training that was initiated in step 1120. When initialization of the PHB is not successful (step 1170=NO), a full reset is performed (step 1172) and method 1000 is done. The full reset performed in step 1172 could be, for example, the full reset shown in method 1000 in FIG. 10. Method 1100 thus allows trying a warm reset first for fatal errors that have warm reset as their corresponding reset mode, and can then resort to a full reset if the warm reset is unsuccessful.

The disclosure and claims herein relate to a PCI host bridge (PHB) that includes a warm reset mode and a full reset mode. A reset mode is defined for multiple fatal errors. When a fatal error occurs, the type of fatal error is determined, the reset mode corresponding to that type of fatal error is determined, and a reset corresponding to the reset mode is performed. A full reset clears the error registers, status registers and configuration registers, which then requires the configuration registers to be reconfigured before the PHB can be reinitialized. A warm reset clears the error registers and status registers, but does not clear the configuration registers. A warm reset thus does not require the time to write to the configuration registers, and the PHB can be reinitialized using the existing configuration data in the configuration registers while link training is done in parallel, which greatly speeds the time for the PHB to recover from a fatal error. When initialization of the PHB after a warm reset is not successful, a full reset is performed.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A method for resetting a PCI host bridge comprising:
providing a warm reset mode in the PCI host bridge that does not clear a plurality of configuration registers and reinitializes the PCI host bridge using existing data in the plurality of configuration registers;
for each of a plurality of fatal errors in the PCI host bridge, defining a corresponding reset mode comprising one of a full reset mode and the warm reset mode;
detecting one of the plurality of fatal errors in the PCI host bridge; and
when the detected one fatal error has a corresponding reset mode that is warm reset, not clearing the plurality of configuration registers and reinitializing the PCI host bridge using existing data in the plurality of configuration registers.

2. The method of claim 1 further comprising:
providing the full reset mode in the PCI host bridge that clears a plurality of configuration registers, reinitializes the plurality of configuration registers, and reinitializes the PCI host bridge using the reinitialized data in the plurality of configuration registers; and when the detected one fatal error has a corresponding reset mode that is full reset, clearing the plurality of configuration registers, reinitializing the plurality of configuration registers, and reinitializing the PCI host bridge using the reinitialized data in the plurality of configuration registers.

3. The method of claim 1 wherein the PCI host bridge comprises a first interface to a processor bus and a second interface to a PCI bus, and wherein, during a warm reset, monitoring activity on the PCI bus, and waiting to perform the warm reset until there is no pending activity on the PCI bus.

4. The method of claim 1 wherein the PCI host bridge comprises a first interface to a processor bus and a second interface to a PCI bus, and wherein, during a full reset, monitoring activity on the PCI bus, and waiting to perform the full reset until there is no pending activity on the PCI bus.

5. The method of claim 1 wherein the PCI host bridge comprises a plurality of error registers that log a plurality of errors in the PCI host bridge and a plurality of status registers that log status information for the PCI host bridge, wherein, during a full reset and during a warm reset, clearing the plurality of error registers and clearing the plurality of status registers.

6. The method of claim 1 wherein the selection of the warm reset mode and the full reset mode is performed by writing to a plurality of bits in a reset register.

7. The method of claim 1 wherein when the warm reset is unsuccessful at reinitializing the PCI host bridge, in response, performing a full reset.

\* \* \* \* \*